United States Patent [19]

Rasshofer et al.

[11] 4,390,640

[45] Jun. 28, 1983

[54] PROCESS FOR THE PRODUCTION OF OPTIONALLY-FOAMED POLYURETHANES

[75] Inventors: Werner Rasshofer, Cologne; Geza Avar, Leverkusen; Hans-Albrecht Freitag, Bergisch Gladbach; Gerhard Grögler, Leverkusen; Richard Kopp, Cologne, all of Fed. Rep. of Germany

[73] Assignee: Bayer Aktiengesellschaft, Leverkusen, Fed. Rep. of Germany

[21] Appl. No.: 342,303

[22] Filed: Jan. 25, 1982

[30] Foreign Application Priority Data

Jan. 15, 1981 [DE] Fed. Rep. of Germany ....... 3100977

[51] Int. Cl.$^3$ ...................... C08G 18/14; C08G 18/24
[52] U.S. Cl. ................................. 521/51; 260/429.7; 521/51; 521/126; 528/58
[58] Field of Search .................... 521/51, 126; 528/58; 260/429.7

[56] References Cited

U.S. PATENT DOCUMENTS 3,306,926 2/1967 Neher et al. ...................... 260/429.7
3,398,169 8/1968 Neumann et al. ................ 260/429.7

OTHER PUBLICATIONS

Davies et al, J. Chem. Soc. C., 1967, pp. 298–300.
Mitchell, J. Organometall. Chem. 59 (1973) pp. 189–197.

*Primary Examiner*—H. S. Cockeram
*Attorney, Agent, or Firm*—Gene Harsh; Joseph C. Gil; Richard A. Elder

[57] ABSTRACT

This invention relates to a process for the production of polyurethanes, particularly polyurethane foam moldings having a compact skin and a cellular core, using special tin activators.

5 Claims, No Drawings

PROCESS FOR THE PRODUCTION OF OPTIONALLY-FOAMED POLYURETHANES

FIELD OF THE INVENTION

This invention relates to a process for the production of polyurethanes, particularly polyurethane foam moldings having a compact skin and a cellular core, using special activators.

The flexible, semi-rigid and rigid polyurethane foam moldings hitherto obtainable on the market are generally based on the crosslinking of aromatic polyisocyanates with polyether or polyester polyols, optionally in combination with known chain-extending agents and crosslinking agents. Moldings of the type are characterized by good mechanical properties which makes them suitable for numerous applications, such as, for example, furniture manufacture, vehicle manufacture and house building and for the production of elastic moldings, such as cushions, shock absorbers and shoe soles.

One disadvantage common to all these moldings is that they turn yellow under the effect of weather and, in addition, undergo surface roughening through chemical degradation, so that, for example, moldings which have to meet increased demands generally have to be provided with a protective layer of lacquer.

The discoloration of polyurethanes under the effect of light is known and occurs particularly when aromatic polyisocyanates are used. Because of this, attempts have recently been made to produce polyurethane foams, including integral forms, using aliphatic and/or alicyclic polyisocyanates.

The polyaddition reaction between polyhydroxyl compounds and polyisocyanates, particularly aliphatic and alicyclic polyisocyanates, on which the formation of polyurethanes is based, requires suitable catalysis in order to obtain a reaction which is fast enough for industrial purposes.

It is known that activator combinations of metal compounds and amine-containing catalysts or other basic catalysts may be used for this purpose. Examples of the metal compounds used are the bis-carboxylates of dialkyl tin compounds, such as di-n-butyl tin dilaurate; the bis-mercaptides of dialkyl tin compounds, such as dimethyl tin bis-(lauryl mercaptide); metal acetyl acetonates, such as Fe(II)acetyl acetonate, Fe(III)acetyl acetonate, dibutyl tin (IV)acetyl acetonate, lead (II)acetyl acetonate; and lead compounds, such as lead di-(2-ethylhexanoate) or bismuth compounds such as bismuth(III)-2-ethyl hexanoate.

In general, however, the catalytic activity of these metal compounds alone is not sufficient for industrial processes. Because of this, basic co-catalysts, such as, for example, amidines (including diazabicycloundecene, diazabicyclononene and dimethyl tetrahydropyrimidine), guanidines (for example, guanidine and tetramethyl guanidine) or tertiary amines, (such as diazabicyclooctane) are frequently used.

The use of these amine-containing co-catalysts often involves a number of serious disadvantages. For example, it has been found that polyol components containing diazabicycloundecene (DBU) lose some of their activity in storage, making re-catalysis necessary. This has been attributed to a reaction of the diazabicycloundecene with water and carbon dioxide, which leads to a less active DBU-hydrogen carbonate, and to a hydrolysis of the reactive carbon-nitrogen double bond. Problems may arise for example, from storing chlorinated hydrocarbons, such as dichloromethane, with catalysts, such as, for example, diazabicyclooctane (DABCO® triethylene diamine) because ammonium salts are formed. Another disadvantage of using these strong amine bases is the normally unpleasant odor which occurs in particular in the manufacture of polyurethane products and which—because the products in question are generally volatile at room temperature—surrounds these products for some considerable time and reduces their utility value.

Still additional disadvantages attributable to the use of known amine and multi-catalyst systems include:

1. When diazabicycloundecene is used as a catalyst, a white coating (consisting partly of diazabicycloundecene) appears, for example, on steering wheels or headrests produced from aliphatic polyisocyanates and polyhydroxyl compounds. That effect is attributable to the volatility the amine compounds and is, of course, very troublesome to industrial processes.

2. It is known that amine catalysts also catalyze the splitting of urethane bonds and ether bonds.

3. When several catalysts are used, problems of activity balance must be taken in consideration.

Since only one catalytically active component is required with the catalysts of the present invention and since the activators according to the invention possess none of the negative amine catalyst properties described herein, the disadvantages of existing commercial catalyst systems are obviated by the present invention.

DESCRIPTION OF THE INVENTION

The present invention relates to a process for the production of optionally-foamed polyurethanes by reacting polyisocyanates with organic compounds containing at least two isocyanate-reactive hydrogen atoms and having molecular weights in the range of from 400 to 10,000 in the presence of activators. Blowing agents, chain-extending agents having a molecular weight in the range from 32 to 400 and other known auxiliaries and additives may also be present. The activators used are compounds corresponding to the general formula

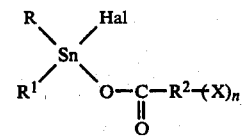

wherein
R and $R^1$ may be the same or different and represent $C_1$–$C_{20}$-alkyl, $C_5$–$C_7$-cycloalkyl or $C_7$–$C_{30}$-alkaryl radicals;

Hal is a halogen atom, preferably a chlorine atom;

$R^2$ is a saturated aliphatic radical containing from 1 to 30 carbon atoms and preferably from 1 to 20 carbon atoms, an unsaturated aliphatic radical containing from 2 to 18 carbon atoms, a cycloaliphatic radical containing from 4 to 7 carbon atoms, or an aromatic radical containing from 6 to 14 carbon atoms;

X represents hydrogen or a group corresponding to the formula

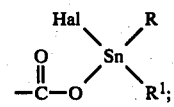

and n is an integer of from 1 to 3.

According to the invention, it is preferred to produce foam moldings having a compact surface and cellular core and to use aliphatic and/or alicyclic polyisocyanates as the isocyanate starting component.

Particularly advantageous properties are obtained where a bis-(2-hydroxyalkyl)-amine, such as, for example, diethanolamine or diisopropanolamine, is used either completely or in part as the crosslinking component. In this connection, it has been found that standard tin catalysts used either on their own or in combination with any of the amine catalysts normally used in polyurethane chemistry do not give satisfactory product properties and, in some cases, are even responsible for unsatisfactory reaction kinetics. (Suitable tin-free catalysts for a system of this type containing bis-(2-hydroxyalkyl)-amine include lead compounds, which unfortunately are physiologically unacceptable, and bismuth compounds which unfortunately are unstable, particularly on exposure to light, so that both classes of products should be avoided.)

It has now surprisingly been found that the activators according to the invention are capable of acting as effective catalysts, even in PU-systems of the type in which aliphatic and/or alicyclic polyisocyanates are used as the polyisocyantes, using chain-extending agents having a molecular weight in the range of from 32 to 400, these chain-extending agents preferably consisting completely or in part of bis-(2-hydroxyalkyl)-amines.

The activators used in accordance with the invention are known. Thus, in Advances in Chem. Soc., 169, 363 (1978), Parker and Carman discusses the occurrence of dibutyl chlorotin laurate by the equilibration of dibutyl tin dilaurate and dibutyl tin dichloride with the aid of $^1$H-NMR-spectra. Davies and Harrison report in J. Chem. Soc. C, 1967, page 298 on the formation of dibutyl chlorotin acetate where dibutyl tin dichloride and dibutyl tin diacetate are combined in tetrachloromethane. In J. Organometall. Chem. 59, 189 (1973), T. N. Mitchell describes the $^{13}$C-NMR-spectrum of the last of the above-mentioned compounds without, however, reporting on its preparation.

Preferred compounds corresponding to the above general formula are those in which R and R$^1$ represent a C$_1$-C$_6$-alkyl radical, n is equal to 1, R$^2$ represents a C$_1$-C$_{11}$-alkylene, C$_4$—C$_7$-cycloalkylene or C$_6$-C$_{10}$-arylene radical and Hal is a chlorine atom. In many cases, it is also preferred for X in the general formula to represent hydrogen and for n to have a value of 1.

The activators according to the invention are obtained, for example, by reacting dialkyl tin dihalides with carboxylic acid metal salts, preferably in the presence of a solvent, such as toluene, xylenes, 1,4-dioxane, dimethyl formamide, sulfolan, dimethyl sulfoxide or dimethoxy ethane. Preferred diorganyl tin dihalides are dialkyl tin dichlorides, such as dimethyl tin dichloride, di-n-butyl tin dichloride, di-n-octyl tin dichloride, with dimethyl tin dichloride being particularly preferred. Preferred carboxylic acid metal salts are the salts of organic carboxylic acids with metals belonging to Groups I, II and III of the Periodic System. The salts of organic carboxylic acids with metals belonging to the First Main Group are particularly preferred. Examples of suitable carboxylic acids are acetic acid, propionic acid, octanoic acid, 2-ethyl hexanoic acid, decanoic acid, undecanoic acid, dodecanoic acid, oleic acid, ricinoleic acid, linoleic acid, malonic acid, succinic acid, maleinic acid, fumaric acid, adipic acid, pimelic acid, suberic acid, azelaic acid, sebacic acid and didodecanoic acid.

According to the invention, it is preferred to use the following activators: dimethyl tin monochloroacetate corresponding to the formula

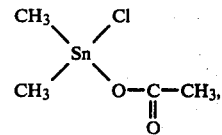

dimethyl tin monochlorooctoate corresponding to the formula

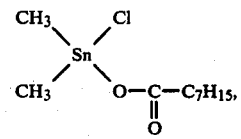

dimethyl tin monochloro-(2-ethyl)-hexanoate correponding to the formula

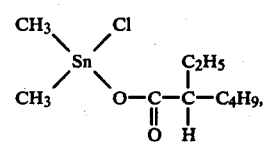

dimethyl tin monochlorododecanoate corresponding to the formula

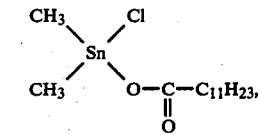

1,12-didodecanoic acid-1,12-(dimethylmonochlorotin)-ester corresponding to the formula

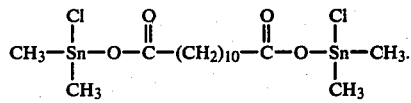

In general, the activators according to the invention may be dissolved without difficulty both in the compounds containing at least two active H-atoms and having molecular weights in the range from 400 to 10,000 and in the isocyanate component. They are preferably dissolved under heat in the compounds containing at least two active H-atoms and having molecular weights in the range from 400 to 10,000, surprisingly without any reaction occurring between this component and the activators.

However, the activators may also be added to the reaction mixture in solid form. In this connection, it has been found that the activity of the dispersed activators is often only slightly different from the activity of dissolved activators.

The activators used in accordance with the invention are normally employed in quantities of from 0.005 to 10% by weight, based on the compounds containing at least two active H-atoms and having molecular weights in the range of from 400 to 10,000, preferably in a quantity of from 0.05 to 5% by weight and, with particular preference, in a quantity of from 0.1 to 4% by weight.

These catalysts are generally compounds which melt without decomposition at low to medium-high temperatures.

In carrying out the process according to the invention, aliphatic, cycloaliphatic, araliphatic, aromatic and heterocyclic polyisocyanates of the type described, for example, by W. Siefken in Justus Liebigs Annalen der Chemie, 562, pages 75 to 136, for example, those corresponding to the formula $$Q(NCO)_n$$

in which n=2-4, preferably 2; and

Q represents an aliphatic hydrocarbon radical containing from 2 to 18 carbon atoms and preferably from 6 to 10 carbon atoms; a cycloaliphatic hydrocarbon radical containing from 4 to 15 carbon atoms and preferably from 5 to 10 carbon atoms; an aromatic hydrocarbon radical containing from 6 to 15 and preferably from 6 to 13 carbon atoms; or an araliphatic hydrocarbon radical containing from 8 to 15 and preferably from 8 to 13 carbon atoms.

Suitable isocyanates are described, for example, on pages 16 to 18 of German Offenlegungsschrift No. 2,916,139.

Preferred polyisocyanates are aliphatic and alicyclic polyisocyanates, such as 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanato-methyl-cyclohexane (German Auslegeschrift No. 1,202,785; U.S. Pat. No. 3,401,190); 2,4- and 2,6-hexahydrotolylene diisocyanate and mixtures of these isomers; hexahydro-1,3- and/or -1,4-phenylene diisocyanate; perhydro-2,4'- and/or -4,4'-diphenyl methane diisocyanate; and polyisocyanates produced therefrom and modified by urethane groups, allophanate groups, isocyanurate groups, urea groups or biuret groups. Mixed trimers of various aliphatic and/or alicyclic polyisocyanates of the type mentioned above are also preferred.

Further starting components include compounds containing at least two isocyanate-reactive hydrogen atoms and having molecular weights of generally from 400 to 10,000. In addition to compounds containing amino groups, thiol groups or carboxyl groups, compounds such as these are preferably compounds containing hydroxyl groups, particularly compounds containing from 2 to 8 hydroxyl groups. Most preferred are those polyhydroxyl compounds having molecular weights of from 1000 to 8000, preferably 1500 to 6000. Examples of these include polyesters, polyethers, polythioethers, polyacetals, polycarbonates and polyester amides containing at least two, generally from 2 to 8 and preferably from 2 to 4 hydroxyl groups, of the type known for the production of cellular and non-cellular polyurethanes (cf. German Offenlegungsschrift No. 2,916,139, pages 19 to 26).

Optional starting components include compounds containing at least two isocyanate-reactive hydrogen atoms and having molecular weights in the range from 32 to 400. In this case, too, the compounds include those containing hydroxyl groups and/or amino groups and/or thiol groups and/or carboxyl groups. Preferred are compounds containing hydroxyl groups and/or amino groups which serve as chain-extending agents or cross-linking agents. These compounds generally contain from 2 to 8 and preferably from 2 to 4 isocyanate-reactive hydrogen atoms. In this case, too, it is possible to use mixtures of different compounds containing at least two isocyanate-reactive hydrogen atoms and having molecular weights in the range from 32 to 400. Examples of suitable compounds are the compounds described on pages 27 to 33 of German Offenlegungsschrift No. 2,916,139.

Optional additives and auxiliaries may include water and/or readily volatile inorganic or organic compounds as blowing agents; other known catalysts (generally in a quantity of from about 0.001 to 10% by weight, based on the total quantity of compounds containing at least two isocyanate-reactive hydrogen atoms); and surface-active additives, such as emulsifiers and foam stabilizers. Additionally, reaction retarders and known cell regulators together with known pigments or dyes and flameproofing agents; stabilizers against the effects of ageing and weather; plasticizers and fungistatic and bacteriostatic substances as well as fillers may also be used. All these auxiliaries and additives are described for example on pages 33 to 38 of German Offenlegungsschrift No. 2,916,139.

Further examples of surface-active additives and foam stabilizers, as well as cell regulators, reaction retarders, stabilizers, flameproofing substances, plasticizers, dyes and fillers and fungistatic and bacteriostatic substances which may optionally be used in accordance with the invention and information on the way in which these additives are used and on their respective modes of action may be found in Kunststoff-Handbuch, Vol. VII, by Vieweg and Hochtlen, Carl-Hanser-Verlag, Munich, 1966, for example, on pages 103 to 113.

According to the invention, the reaction components are reacted by the known one-shot process, by the prepolymer process or by the semi-prepolymer process, in many cases using machines, for example, of the type described in U.S. Pat. No. 2,764,565. Particulars of processing machines which may also be used in accordance with the invention may be found in Kunststoff-Handbuch by Vieweg and Hochtlen, Vol. III, Carl-Hanser-Verlag, Munich, 1966, for example, on pages 121 to 205.

In the production of foams, it is also possible in accordance with the invention to carry out foaming in closed molds. To this end, the foamable reaction mixture is introduced into a mold made of metal, for example, aluminum, or plastic, for example, epoxide resin, and allowed to foam and form the molding. In-mold foaming may be carried out in such a way that the molding has a cellular structure at its surface, or in such a way that the molding has a compact skin and a cellular core. In this connection, it is possible, in accordance with the invention, to introduce a foamable reaction mixture into the mold in such a quantity that the foam formed just fills the mold or to introduce into the mold more foamable reaction mixture than is required for filling the interior of the mold with foam. This latter technique is known as "over-charging" and is shown, for example, in U.S. Pat. Nos. 3,178,490 and 3,182,104.

In many cases, "external release agents", such as silicone oils, are used when foaming is carried out in molds. However, it is also possible to use so-called "internal release agents", optionally in admixture with external release agents, of the type known, for example, from German Offenlegungsschrift Nos. 2,121,670 and 2,307,589.

According to the invention, it is also possible to produce cold-hardening foams (see British Pat. No. 1,162,517 and German Offenlegungsschrift No. 2,153,086) and foams may, of course, also be produced by block foaming or by the known laminator process.

The products obtainable in accordance with the invention are used, for example, as shoe soles, steering wheels, arm rests, headrests, upholstery material, sound insulating materials, moldings having a compact skin and a cellular core (integral foams) as e.g. obtainable by the process of German patent No. 1 694 138 (Canadian patent No. 879 796), coating materials, packaging materials and mattresses.

The invention is further illustrated, but is not intended to be limited by the following examples in which all parts and percentages are by weight unless otherwise specified.

EXAMPLES

Starting Compounds

I. Isocyanates

Isocyanate A: a semi-prepolymer of isophorone diisocyanate and a glycerol-started polypropylene ether (OH-number 670) having an NCO-content of 28%.

Isocyanate B: a prepolymer of 1,6-diisocyanatohexane and dipropylene glycol having an NCO-content of 14%.

Isocyanate C: a modified 1,6-diisocyanatohexane containing biuret units and having an NCO-content of 21.3%.

Isocyanate D: a semi-prepolymer of 4,4'-diisocyanatodiphenyl methane and tripropylene glycol having an NCO-content of 22.8%.

Isocyanate E: a modified 1,6-diisocyanatohexane containing biuret units and having an NCO-content of 23%.

Isocyanate F: a mixture of 80% b.w. of tolylene diisocyanate and 20% b.w. of polymeric 4,4'-diisocyanatodiphenyl methane (NCO-content 44.5%).

II. Polyols

Polyol A: a trifunctional trimethylol-propane-started PO/EO-polyether polyol (with 22% b.w. of terminal EO) having an OH-number of 27 and an average molecular weight of 6222.

Polyol B: a difunctional propylene glycol-started PO/EO-polyether polyol (with 20% b.w. of terminal EO) having an OH-number of 28 and an average molecular weight of 4000.

Polyol C: a trifunctional trimethylol-propane-started PO/EO-polyether polyol (with 13.5% b.w. of terminal EO) having an OH-number of 35 and an average molecular weight of 4500.

Polyol D: a reaction product of glycerol and propylene oxide having an OH-number of 1050.

Polyol E: a reaction product of trimethylol propane with propylene oxide having an OH-number of 930.

Polyol F: a trimethylol-propane- and propylene-glycol-started PO/EO-polyether polyol (with 30% b.w. of EO) having a functionality of 2.78, an average molecular weight of 3700 and an OH-number of 42.

Polyol G: a trifunctional trimethylol-propane-started PO/EO-polyether polyol having an OH-number of 28.

Polyol H: a trifunctional PO/EO polyether polyol with 17% b.w. of EO (OH-number 35) modified with an organic filler (polyurea) and having an OH-number of 28.

III. Catalysts

Catalyst A: dimethyl tin monochloro-(2-ethyl)hexanoate corresponding to the formula $$\begin{array}{c} CH_3 \\ \phantom{CH_3} \diagdown \\ \phantom{CH_3} Sn \\ \phantom{CH_3} \diagup \phantom{\diagdown} \diagdown \\ CH_3 \phantom{\diagup} O-C-C-C_4H_9 \\ \phantom{CH_3} \phantom{O-}\parallel \phantom{-}| \\ \phantom{CH_3} \phantom{O-}O \phantom{-}H \end{array}$$

with $C_2H_5$ branch on the central C.

Catalyst B: dimethyl tin monochlorododecanoate corresponding to the formula $$\begin{array}{c} CH_3 \quad Cl \\ \diagdown \diagup \\ Sn \\ \diagup \diagdown \\ CH_3 \quad O-C-C_{11}H_{23} \\ \phantom{CH_3 \quad O-}\parallel \\ \phantom{CH_3 \quad O-}O \end{array}$$

Catalyst C: dimethyl tin monochloroacetate corresponding to the formula $$\begin{array}{c} H_3C \quad Cl \\ \diagdown \diagup \\ Sn \\ \diagup \diagdown \\ H_3C \quad O-C-CH_3 \\ \phantom{H_3C \quad O-}\parallel \\ \phantom{H_3C \quad O-}O \end{array}$$

Catalyst D: dimethyl tin monochloro-oleate corresponding to the formula $$\begin{array}{c} H_3C \quad Cl \\ \diagdown \diagup \\ Sn \\ \diagup \diagdown \\ H_3C \quad O-C-C_{17}H_{33} \\ \phantom{H_3C \quad O-}\parallel \\ \phantom{H_3C \quad O-}O \end{array}$$

Catalyst E: diethyl tin monochloroacetate corresponding to the formula $$\begin{array}{c} C_2H_5 \quad Cl \\ \diagdown \diagup \\ Sn \\ \diagup \diagdown \\ C_2H_5 \quad O-C-CH_3 \\ \phantom{C_2H_5 \quad O-}\parallel \\ \phantom{C_2H_5 \quad O-}O \end{array}$$

Catalyst F: didodecanoic acid-1,12-bis-(dimethylmonochlorotin)-ester corresponding to the formula $$\begin{array}{c} Cl \phantom{xxxx} O \phantom{xxxxxx} O \phantom{xxxx} Cl \\ | \phantom{xxxx} \parallel \phantom{xxxxxx} \parallel \phantom{xxxx} | \\ CH_3-Sn-O-C-(CH_2)_{10}-C-O-Sn-CH_3 \\ | \phantom{xxxxxxxxxxxxxxxxxxxxxxxxxxx} | \\ CH_3 \phantom{xxxxxxxxxxxxxxxxxxxxxxxx} CH_3 \end{array}$$

The reaction times quoted in the Application Examples are defined as:

$T_1$ = cream time (time in seconds after the isocyanate component has been stirred in at which the mixture begins to foam);

$T_2$ = rise time (time in seconds after the isocyanate component has been stirred in after which the rising process is complete);

$T_3$ = tack-free time (time in seconds after the isocyanate component has been stirred in at which the surface of the foam is no longer tacky);

$T_4$ = plucking time (time in seconds after the isocyanate component has been stirred in at which small fragments can no longer be torn from the foam with the fingers).

The following examples illustrate the production of semi-rigid polyurethane foam based on aliphatic and alicyclic polyisocyanates:

EXAMPLE 1

Formulation: Component A:
  90 g of polyol A
  5 g of ethylene glycol
  4 g of diethanolamine
  1 g of catalyst B
  12 g of trichlorofluoromethane
Component B:
  46 g of isocyanate A The constituents of Component A are combined at room temperature and intensively mixed for 30 seconds using a high-speed stirrer. The indicated quantity of Component B is added, intensive mixing is then continued for another 30 seconds at room temperature and the reaction mixture subsequently left to foam in a free foam packet.

A cream time of 37±3 seconds and a gel time of 130±10 seconds were observed.

By comparison, if the above test is repeated using 1 g of tin dioctoate or 1 g of dibutyl tin dilaurate instead of catalyst B, the foams stay tacky for several days without setting.

EXAMPLE 2

Formulation: Component A:
  90 g of polyol A
  5 g of ethylene glycol
  4 g of diethanolamine
  1 g of Tinuvin 327 ® (light stabilizer, a product of Ciba-Geigy AG)
  12 g of trichlorofluoromethane
  1 g of catalyst A
Component B:
  89 g of isocyanate B The constituents of Component A were combined at room temperature and intensively mixed for 30 seconds with a high-speed stirrer. The indicated quantity of isocyanate was added, intensive mixing was continued for another 30 seconds at room temperature and the reaction mixture was then left to foam in a free foam packet.

A cream time of 36±3 seconds and a gel time of 89±5 seconds were observed.

A foam square measuring 20×20×1 cm produced in a standard hinged laboratory mold of aluminum had a Shore A hardness of 57 and a density of 660 kg/m$^3$, could be removed from the mold without difficulty and was characterized by high elasticity.

By contrast, if the above test is repeated using 1 g of tin dioctoate instead of catalyst A, a cream time of 60±5 seconds and a gel time of more than 5 minutes are observed, the foam remaining tacky for a long time.

EXAMPLE 3

Formulation: Component A:
  169 g of polyol A
  9.4 g of ethylene glycol
  7.5 g of diethanolamine
  1.87 g of catalyst A
  20 g of trichlorofluoromethane
  2 g of Tinuvin 327 ® (light stabilizer, a product of Ciba-Geigy AG)
Component B:
  119 g of isocyanate C
  3 g of foam stabilizer (PU 3110 of Bayer AG, Germany)

The constituents of Component A are combined at room temperature and intensively mixed for 30 seconds with a high-speed stirrer. The indicated quantity of Component B is added, intensive mixing is continued for another 30 seconds at room temperature and the reaction mixture is subsequently allowed to foam in a free foam packet.

A cream time of 35±3 seconds and a gel time of 84±5 seconds were observed.

A foam square measuring 20×20×1 cm produced from the above mixture in a standard hinged aluminum laboratory mold had a Shore A hardness of 69 and a density of 665 kg/m$^3$, could be easily removed from the mold and was characterized by high elasticity.

By comparison, if the above test is repeated using 1 g of tin dioctate or 1 g of dibutyl tin dilaurate instead of catalyst A, the foams remain tacky for several days without setting.

EXAMPLE 4

Formulation: Component A:
  90 g of polyol A
  5 g of ethylene glycol
  4 g of diethanolamine
  10 g of trichlorofluoromethane
  1 g of catalyst E
Component B:
  46 g of isocyanate A The preparation procedure is the same as described in Example 3.

A cream time of 35±3 seconds and a gel time of 110±10 seconds were observed.

If the above test is repeated using 1 g of tin dioctoate or 1 g of dibutyl tin dilaurate instead of catalyst E, the foams remain tacky for several days without setting.

The following examples illustrate the production of polyurethane foam based on aromatic polyisocyanates:

EXAMPLE 5

Formulation: Component A:
  70 g of polyol B
  20 g of polyol C
  1 g of ethylene glycol
  14 g of butane diol-14
  0.1 g of water
  0.02 g of catalyst F
  x g of DABCO ® (triethylene diamine)
Component B:
  74 g of isocyanate D The preparation procedure is the same as described in Example 3.

The following times are obtained:

| DABCO ® (g) | T₁ (secs. ± 3) | T₂ (secs. ± 3) | T₃ (secs. ± 3) | T₄ (secs. ± 3) |
|---|---|---|---|---|
| 0.3 | 21 | 42 | 58 | >3 |
| 0.6 | 16 | 33 | 48 | >3 |
| 1.2 | 13 | 22 | 33 | 55 |

If the above test is repeated using a mixture of 0.02 g of dibutyl tin dilaurate and 0.3 g of DABCO ®, instead of catalyst F, a T₁-value of 30 seconds and a T₄-value of 65 seconds are obtained.

The following examples illustrate the production of rigid integral polyurethane foam based on aliphatic isocyanates:

EXAMPLE 6.1 (COMPARISON EXAMPLE)

Formulation: A-component:
- 35 g of polyol D
- 35 g of polyol E
- 30 g of polyol F
- 1 g of foam stabilizer (a product of the Goldschmidt Company, Essen, based on polysiloxane/polyalkylene oxide block copolymer)
- 0.8 g of diazabicycloundecene
- 1.3 g of dibutyl tin dilaurate
- 30 g of trichlorofluoromethane B-component:
- 252.4 g of isocyanate E The constituents of the A-component were combined at room temperature and intensively mixed for 30 seconds with a high-speed stirrer. The indicated quantity of isocyanate is added, intensive mixing is continued for another 30 seconds at room temperature and the reaction mixture subsequently left to foam in a free foam packet.

A cream time of 38±3 seconds and a gel time of 47±3 seconds were observed.

EXAMPLES 6.2–6.5

In these Examples, diazabicycloundecene and dibutyl tin dilaurate are replaced by the catalysts used in accordance with the invention. These Examples also illustrate the good effect of the suspended catalysts.

TABLE 1

| Example No. | Catalyst | Quantity$^{(a)}$ | | Cream time | Gel time |
|---|---|---|---|---|---|
| 6.2 | Catalyst A | 3 | g S | 46 ± 5 | 50 ± 5 |
| | | 3 | g L | 46 ± 5 | 48 ± 5 |
| | | 4 | g S | 43 ± 5 | 47 ± 5 |
| 6.3 | Catalyst B | 3 | g S | 59 ± 5 | 65 ± 5 |
| | | 5 | g S | 39 ± 3 | 45 ± 5 |
| 6.4 | Catalyst C | 3.7 | g S | 73 ± 5 | 78 ± % |
| 6.5 | Catalyst D | 3 | g L | 44 ± 5 | 47 ± 5 |
| | | 3 | g S | 41 ± 5 | 44 ± 5 |

$^{(a)}$L: in the form of a solution of the catalyst in the OH—component or in the form of a suspension (S)

The tests are carried out in the same way as described in Comparison Example 6.1.

EXAMPLE 6.6

This example compares the catalytic activities of a combination of diazabicycloundecene and dibutyl tin dilaurate with a combination of diazabicycloundecene and one of the catalysts used in accordance with the invention.

If the formulation indicated in 6.1 is used and if dibutyl tin dilaurate is replaced by catalyst B, the following times are obtained (for the same procedure as in 6.1):

| | Cream time (secs.) | Gel time (secs.) |
|---|---|---|
| 1 g of diazabicycloundecene 1 g of catalyst B | 29 ± 3 | 44 ± 5 |
| 1 g of diazabicycloundecene 1.5 g of catalyst B | 27 ± 2 | 35 ± 3 |

EXAMPLE 7

This example demonstrates the stability in storage (stored at room temperature) of catalyst A (as a representative example).

Formulation: Component A:
- 900 g of polyol A
- 50 g of ethylene glycol
- 40 g of diethanolamine
- 10 g of catalyst A Component B:
- isocyanate A 12 g of trichlorofluoromethane and 46 g of isocyanate A were added at regular intervals to 100 g of the single-phase A-component, followed by careful mixing at room temperature using a high-speed stirrer. The reaction mixture was then left to foam in a free foam packet.

The following times were measured:

| | Cream time (secs. ± 5) | Gel time (secs. ± 10) |
|---|---|---|
| 0 days | 47 | 165 |
| 6 days | 55 | 180 |
| 16 days | 50 | 175 |
| 34 days | 53 | 170 |

The following examples illustrate the production of non-foamed elastomers:

EXAMPLE 8

100 g of a linear polypropylene ether (molecular weight 2000, OH-number 56) are throughly mixed with 29 g of dimeric 4,4'-diisocyanatodiphenyl methane produced in known manner (uretdione diisocyanate; NCO-content 14.5%). Quantities of 0.5 g of each of catalysts A, B, C, D and E are added to five different resulting suspensions, after which the reaction mixture is heated for 4 hours at 120° C.

Polyurethane elastomers having a Shore A hardness of approximately 52 are obtained.

By adding 0.5 g of tin dioctoate instead of catalysts A, B, C, D and E, considerably more flexible polyurethane materials (Shore A hardness 30–40) are obtained under these reaction conditions, indicating an incomplete reaction.

EXAMPLE 9

If the polyether characterized in Example 8 is replaced by 100 g of a copolyester of adipic acid and ethylene glycol/butylene glycol (molecular weight 2000, OH-value: 56), an elastic polyurethane material having a Shore A hardness of 60 is obtained after the addition of 0.5 g of catalysts, A, B, C, D and E and heating for 3 hours to 120° C. In the absence of catalysis, no reaction takes place, even after a prolonged heating phase, and the reaction mixture remains liquid.

The following example illustrates the production of a flexible foam.

EXAMPLE 10

Formulation: Component A:
- 80 g of polyol G
- 20 g of polyol H
- 3.1 g of water
- 1 g of a foam stabilizer (PU 3110 of Bayer AG, Germany)
- 0.1 g of activator (Niax ® A1, a product of the Union Carbide Co.)
- 0.5 g of activator (PU 3117, a product of Bayer AG)
- 0.2 g of catalyst D Component B:
- 37.1 g of isocyanate F A molded foam produced in known manner from the above mixture of components A and B in an aluminium box mold (mold temperature 50° to 55° C.) was characterized by the following data:

cream time: 8 seconds
fiber time:+ 65±5 seconds
rise time: 120±10 seconds
mold-release time: 9 minutes.

+(time is seconds after mixing of components A and B at which fibers can be drawn out of the foam)

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of optionally-foamed polyurethanes comprising reacting polyisocyanates with organic compounds containing at least two isocyanate-reactive hydrogen atoms and having molecular weights from 400 to 10,000 in the presence of activators, characterized in that the activators used are compounds corresponding to the general formula:

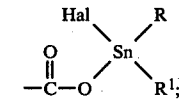

in which
R and $R^1$ may be the same or different and represent $C_1$-$C_{20}$-alkyl, $C_5$-$C_7$-cycloalkyl or $C_7$-$C_{30}$-alkaryl radicals;
Hal represents a halogen atom;
$R^2$ represents a halogen atom;
$R^2$ represents a saturated aliphatic radical containing from 1 to 30 carbon atoms; an unsaturated aliphatic radical containing from 2 to 18 carbon atoms; a cycloaliphatic radical containing from 4 to 7 carbon atoms; or an aromatic radical containing from 6 to 14 carbon atoms;
X represents hydrogen or a group corresponding to the formula $$\begin{array}{c} Hal \quad R \\ \diagdown \quad \diagup \\ O \quad Sn \\ \| \quad \diagup \quad \diagdown \\ -C-O \quad R^1; \end{array}$$

and
n is an integer of from 1 to 3.

2. A process according to claim 1, characterized in that, Hal is a chlorine atom.

3. A process according to claim 1, characterized in that the activators are used in a quantity of from 0.05 to 5% by weight, based on the compounds containing at least 2 active hydrogen atoms and having molecular weights in the range from 400 to 10,000.

4. A process according to claim 1 or claim 3, characterized in that foam moldings having a compact skin and a cellular core are produced.

5. A process as claimed in claim 1 or claim 3, characterized in that aliphatic and/or alicyclic polyisocyanates are used as the polyisocyanates.

* * * * *